April 24, 1951  E. D. LILJA ET AL  2,549,829
CONTROL FOR SERVO ACTUATORS
Filed Aug. 6, 1943  4 Sheets-Sheet 1

INVENTORS
*Edgar D. Lilja* and *Donald L. Hall*
BY
*Parker, Carlson, Pitzner & Hubbard*
ATTORNEYS

April 24, 1951  E. D. LILJA ET AL  2,549,829
CONTROL FOR SERVO ACTUATORS
Filed Aug. 6, 1943  4 Sheets-Sheet 2

INVENTORS
Edgar D. Lilja and Donald L. Hall
BY
Parker, Carlson, Pitzner & Hubbard
ATTORNEYS April 24, 1951 E. D. LILJA ET AL 2,549,829
CONTROL FOR SERVO ACTUATORS
Filed Aug. 6, 1943 4 Sheets-Sheet 4

INVENTORS
Edgar D. Lilja and Donald L. Hall
BY Parker, Carlson, Pitzner & Hubbard
ATTORNEYS Patented Apr. 24, 1951

2,549,829

UNITED STATES PATENT OFFICE 2,549,829

CONTROL FOR SERVO ACTUATORS

Edgar D. Lilja and Donald L. Hall, Rockford, Ill., assignors to Barber-Colman Company, Rockford, Ill., a corporation of Illinois Application August 6, 1943, Serial No. 497,670

22 Claims. (Cl. 318—30)

This invention relates to a method of and apparatus for controlling the operation of a power servo to cause a member driven thereby to be positioned accurately in accordance with changes in the position of a control element or changes in the value of an electrical, physical or chemical condition. The invention is especially applicable to systems in which the driving power is supplied by an electric motor.

One object of the invention is to provide a novel method of and apparatus for stabilizing the operation of a control of the above character particularly in systems wherein the hunting oscillations tend to occur frequently or the tendency toward hunting or overrunning is due primarily to the inertia of the servo and the parts connected thereto.

Another object is to stabilize the operation of such a servo actuator by applying a secondary control effect which is varied automatically and in a novel manner as a function of the load imposed on the actuator.

A further object is to derive the stabilizing voltage directly from a circuit of the driving electric motor.

Still another object is to derive the stabilizing voltage from the control windings of an electric servomotor which is reversed by varying the phase of current exciting such windings.

It is also an object to provide a novel stabilizing control which is operable with alternating or direct current motors.

The invention also resides in the novel manner of detecting the hunting tendencies and in utilizing the same to stabilize the servo operation.

A further object is to adapt a control of the above character to a system in which the transmission of power is through the intermediary of friction clutches.

Other objects and advantages of the invention will become apparent from the following detailed description taken in connection with the accompanying drawings, in which.

It will be apparent as the description proceeds that the invention is applicable to a wide variety of uses for governing the actuation of different kinds of indicating, recording, control or regulating devices. Typical adaptations are shown in the drawings and will be described herein merely by way of illustration. It is to be understood that we do not intend to limit the invention in any way by such exemplary disclosures, but aim to cover all modifications and alternative constructions, methods, and uses falling within the spirit and scope of the invention as expressed in the appended claims.

The invention is especially suited for controlling the transmission of rotary power by an electric motor to overcome a variable load and maintain accurate positional agreement between a member driven by the motor and a variably movable control element. When the power output of such a motor is adjusted to correspond to the positional disagreement between the driven member and the control element so as to accelerate the load more rapidly as the disagreement increases, the load reacts on the motor and there is generated in the motor circuit a voltage component which modifies the input current flowing in the motor. We have discovered that such a system may be stabilized very precisely and its hunting tendency overcome by introducing into the circuit governing the power output of the motor a secondary voltage which corresponds in magnitude and sense to said load reaction component.

Based on this discovery, the invention contemplates generally the creating of a control voltage proportional in magnitude and corresponding in direction or phase to the positional disagreement between the control element and the servo driven member, varying the delivery of power by the servomotor in accordance with such control voltage, and superimposing on said control voltage a secondary voltage which is a function of the input current of the motor and the load thereon. The stabilizing voltage acts to produce a shift in the control or balance point of the system and initiate a reduction in the motor torque in advance of the return of the driven member to its real control point. The result of this anticipatory action is to adjust the motor input so as to correct for large positional deviations rapidly and to slow down the rate of correction progressively as the driven member approaches its control point and positional agreement with the control element thereby minimizing any tendency toward overrunning.

Figure 1:
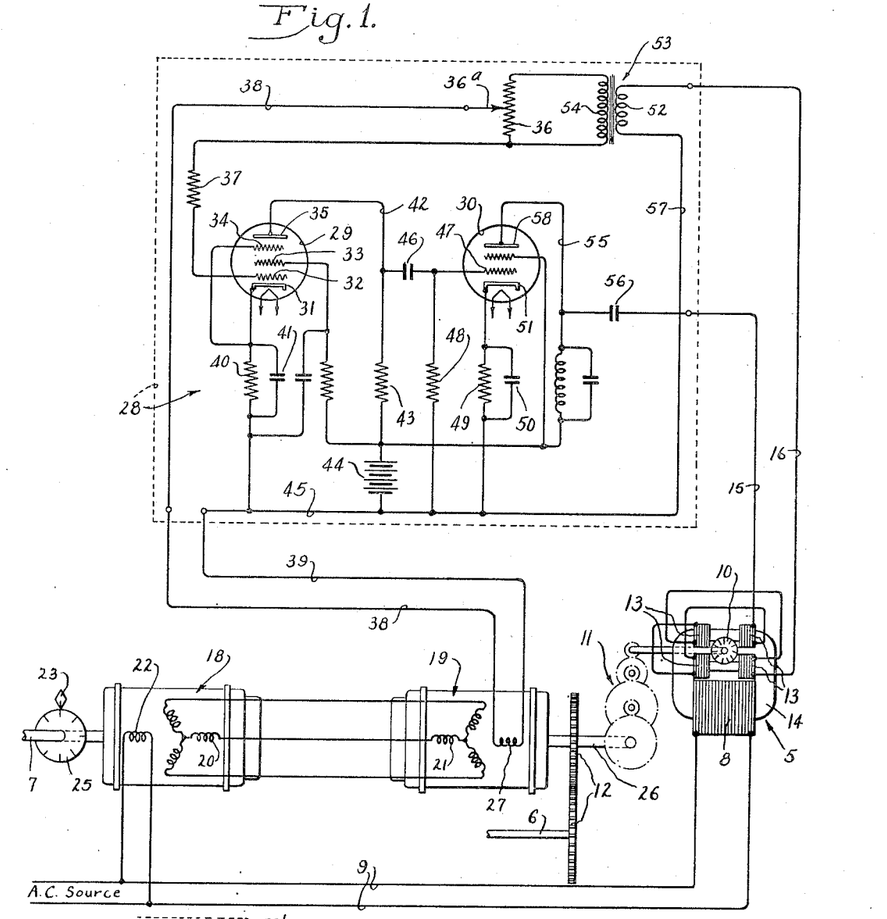
Figure 1 is a schematic view and wiring diagram of a power servo and a control therefor embodying the present invention.

The exemplary apparatus shown in Fig. 1 operates directly to control the energization of a reversible electric motor 5 to turn a shaft 6 and the load connected thereto varying distances back and forth so that the angular position of the shaft follows changes in the position of a movable control element such as a rotary shaft 7. The motor shown is of the shaded pole induction type having a main winding 8 continuously energized by alternating current from lines 9 and an induction type rotor 10 whose shaft is connected through reduction gearing 11 and spur gears 12 of equal sizes to the loaded shaft 6. The direction of motor operation and the power output are controlled through the use of multiple turn auxiliary windings 13 inductively arranged on the poles of the stator 14 and angularly spaced around the rotor recess. The windings are connected in series relation between conductors 15 and 16 so that the rotor 10 will turn in a direction determined by the phase relation of the current flowing through the windings 13 as compared to that applied to the main winding, and the power delivered by the motor will be proportional to the magnitude of the current in the auxiliary windings.

The creation of the control voltage above referred to may be effected in various ways. As shown in Fig. 1, it is accomplished by comparing the angular positions of the control and driven shafts 7 and 6 through self-synchronous motors 18 and 19 commonly called "synchros," the receiver 19 being of the transformer type. The terminals of the three phase stator windings 20 and 21 of the synchros are interconnected as shown and the rotor winding 22 of the transmitter is energized constantly from the alternating current source. The stator winding 21 is inductively coupled to a single phase rotor winding 27. The shaft of the transmitter 18 constitutes the control element 7 above referred to, its position being indicated by a pointer 23 coacting with a scale on a disk 25 carried by the shaft. Through the gears 12, the shaft 26 of the receiving synchro 19 is turned in synchronism with the servo driven member 6. With this arrangement, a voltage will be induced in the winding 27 which is a sinusoidal function of the angular displacement or positional disagreement of the shafts 6 and 7, being zero when the shafts are precisely in positional agreement, and reversing in phase with reversal of the direction of positional disagreement.

Preferably, the control voltage thus derived is amplified in a multi-stage electronic network 28 the output of which is applied to the motor windings 13. As shown herein, the amplifier has two stages comprising a pentode tube 29 and screen grid tetrode 30. The pentode has the usual indirectly heated cathode 31, control grid 32, screen grid 33, suppressor grid 34 and anode 35. Two series-connected sources of control potential are provided in the input circuit of the pentode between control grid and cathode. The first of these is the winding 27 of the transformer synchro 19 and the other is derived from a potentiometer resistor 36 and serves to modify the first-mentioned control potential for stabilization purposes in a manner hereinafter described. The input circuit of the first stage tube thus extends from the control grid 32 through a resistor 37, a portion of the potentiometer 36, conductor 38, the synchro winding 27, a conductor 39, and a resistor 40 shunted by a condenser 41.

The output circuit of the tube 29 is completed from anode to cathode through a conductor 42, a load resistor 43, a battery 44 for applying plate voltage, a conductor 45 and the resistor 40 and condenser 41 heretofore noted. The output of the tube 29 is coupled to the input of the second stage tube 30 by a condenser 46. The input circuit of such second tube is completed from the control grid 47 through a resistor 48 and a second resistor 49 shunted by a condenser 50 to the cathode 51.

In the output circuit of the tube 30, current is passed in series through the auxiliary windings 13 of the motor 5 and through the primary winding 52 of a current transformer 53, the secondary winding 54 of the latter being connected to impress a potential across the potentiometer 36. The anode to cathode circuit is completed from the anode 58 through a conductor 55, a coupling condenser 56, the conductor 15, windings 13, the conductor 16 to the transformer primary winding 52, and then through a conductor 57 and the shunt-connected resistor 49 and condenser 50 to the cathode 51.

The current in the auxiliary windings 13 and winding 52 of transformer 53 is determined by the voltage supplied from the output of the tube 30, the impedance of the auxiliary winding 13, and the generated voltage due to the velocity of the rotor 10. The voltage supplied from the network 28 is in turn determined by the discrepancy voltage from the synchro 19 and the voltage from the potentiometer 36 which is proportional to the current in the auxiliary winding 13. Because the voltage amplified is made up of the discrepancy voltage from synchro 19 and the voltage from potentiometer 36, which is caused by the current in the auxiliary winding, the voltage impressed on the auxiliary windings is a function of the discrepancy voltage and current in the auxiliary windings. Thus, the current in the auxiliary winding and therefore the torque of the motor may be considered as made up of three components. One component is a result of the discrepancy voltage, another component a result of the load current of the motor, and the third component a result of the speed of the motor.

Figures 3, 4, 5:
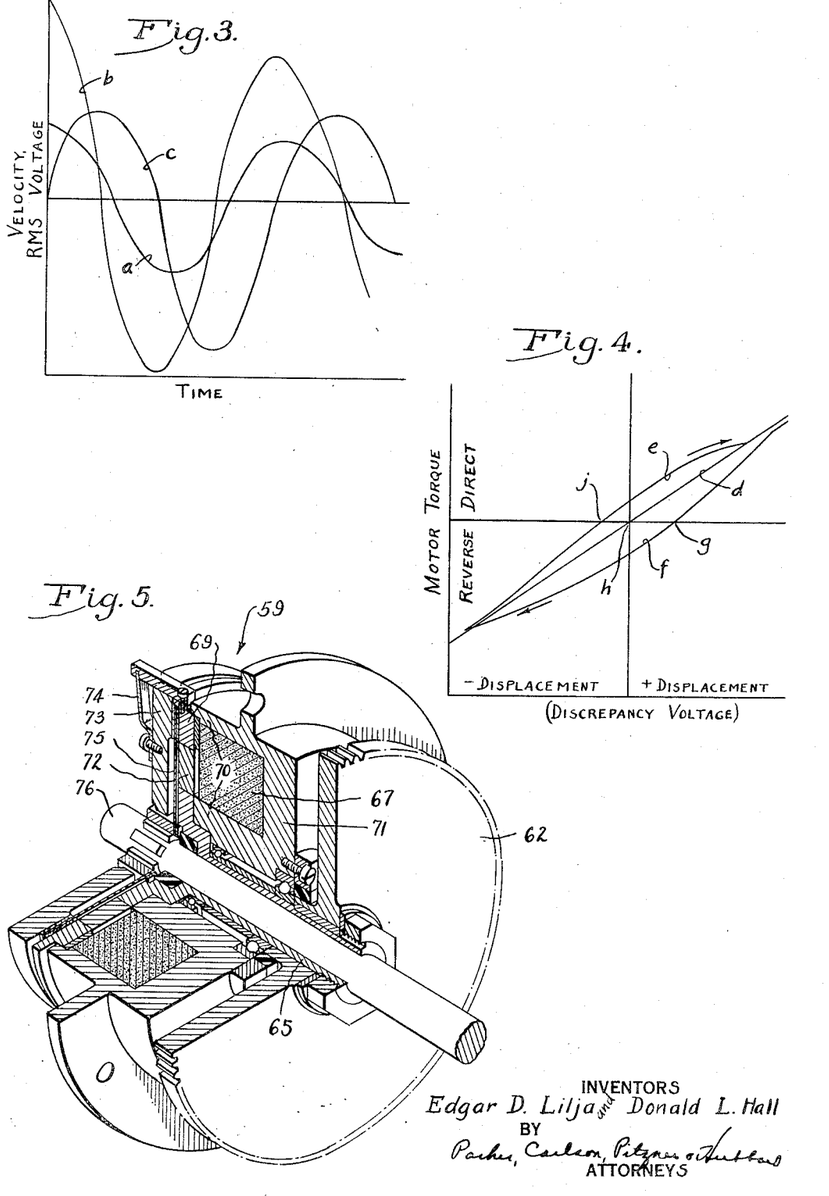
Figs. 3 and 4 show curves of the control as shown in Fig. 1.
Fig. 5 is a perspective view of one of the clutches shown in Fig. 6.

Fig. 3 illustrates the manner in which the voltage thus fed back into the amplifying network and indicated by the curve $a$ may vary with the positional discrepancy or main control voltage (curve $b$) and with the servo velocity (curve $c$). These curves indicate that the total feed back voltage is equal to $$c\theta + c_1\dot{\theta} + c_2\ddot{\theta}$$

where $c$, $c_1$ and $c_2$ are constants depending on the characteristics of the amplifier, the motor, and the load and $\theta$ is the angular displacement of the shafts 6 and 7, $\dot{\theta}$ is the first derivative and $\ddot{\theta}$ the second derivative. Thus, it may be said that the feed back voltage varies roughly as a function of the velocity and also as a function of acceleration of the servomotor.

The action of the load reaction component of the motor current in preventing overrunning is well illustrated by the curves of Fig. 4 which may be calculated from the data in Fig. 3. The static curve $d$ shows the variation of the motor torque due to positional discrepancy alone between the shafts 6 and 7 while the transient curves $e$ and $f$ show the modified motor torque resulting from the feed back voltage while the servo is traveling in directions indicated by the arrows. Assuming a start from standstill with an initial displacement at a remote point along line $d$, it will be observed that as the displacement is decreased along the upper portion of the curve $f$, the motor torque is reduced below the static curve; whereas the torque is increased in the reverse direction along the curve $e$. Thus, as the positional disagreement is reduced, the resultant torque reaches zero at $g$ in advance of the arrival of the driven shaft at the control point $h$, the spacing of the points $g$ and $h$ representing the control point shift by the stabilizing component. At the point $g$, the motor torque reverses in sense which thus becomes effective in advance of the control point to dissipate the kinetic energy of the rotating parts. The rate of such dissipation is for the reasons pointed out above influenced by the load on the motor and therefore by the prevailing velocity and acceleration. Similarly, during reverse rotation of the servomotor, the sense of the motor torque reverses at $j$ thereby anticipating the arrival of the driven shaft at the control point. As a result of this shifting of the control point produced by the stabilizing voltage, it has been found that any tendency toward overrunning of the control point due to the inertia of the motor and the parts driven thereby is compensated for, effectively producing accurate positional agreement between the shafts 6 and 7, and this, in spite of sudden load changes that may be imposed.

Figure 2:
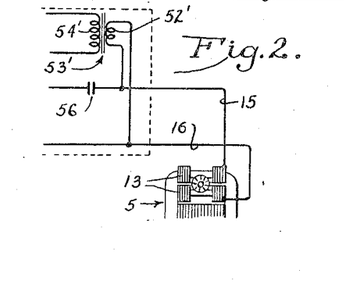
Fig. 2 is a fragmentary view showing a modification of Fig. 1.

If desired, the stabilizing voltage component may be obtained by replacing the current transformer 53 with a voltage transformer 53' having its primary winding 52' connected in parallel with the motor control windings 13 as is illustrated in Fig. 2. In such a case, the line 16 is extended back to the line 45. It will be obvious, however, that after such change from a series to a parallel circuit that the stabilizing signal will no longer be a direct function of the differential between the applied voltage and the self-generated voltage but substantially a function of the mean value of the applied voltage and the generated voltage.

In cases where the servomotor is of substantial size, it is desirable to reduce the inertia of the servo parts, a large part of which inertia is due to the rotor of the servomotor. For this purpose, power may be supplied by a unidirectional motor 58 (Fig. 6) energized from an alternating current supply line 95, and the transmission of power in opposite directions is controlled by friction clutches 59 and 60 which are controlled magnetically in the present instance by the selective energization of windings 67 and 68. The motor operates continuously through meshing gears 61 to 63 to drive sleeves 65 and 66 of the clutches in opposite directions. Fast on each sleeve is a plate 69 (Fig. 5) which constitutes the driving clutch element and lies closely adjacent annular poles 70 which are separated by the winding 67 on a stationary magnet ring 71. The inner and outer magnetic portions of the plate 69 are separated by a non-magnetic ring 72. These cooperate with a magnetic disk 73 to form a magnetic flux circuit around the coil 70, the disk 73 being continuously urged by leaf springs 74 toward the plate 69. The driven element of the clutch 59 is a thin disk 75 disposed between the plate 69 and the disk 73 and fast on a shaft 76 carrying a gear which meshes with a gear 77 on a shaft which drives the loaded shaft 6 in one direction through reduction gearing 79. The shaft 6 is adapted to be driven alternatively in the opposite direction by the clutch 60 through a gear 77ª on the driven shaft 76ª of the latter clutch.

Figure 6:
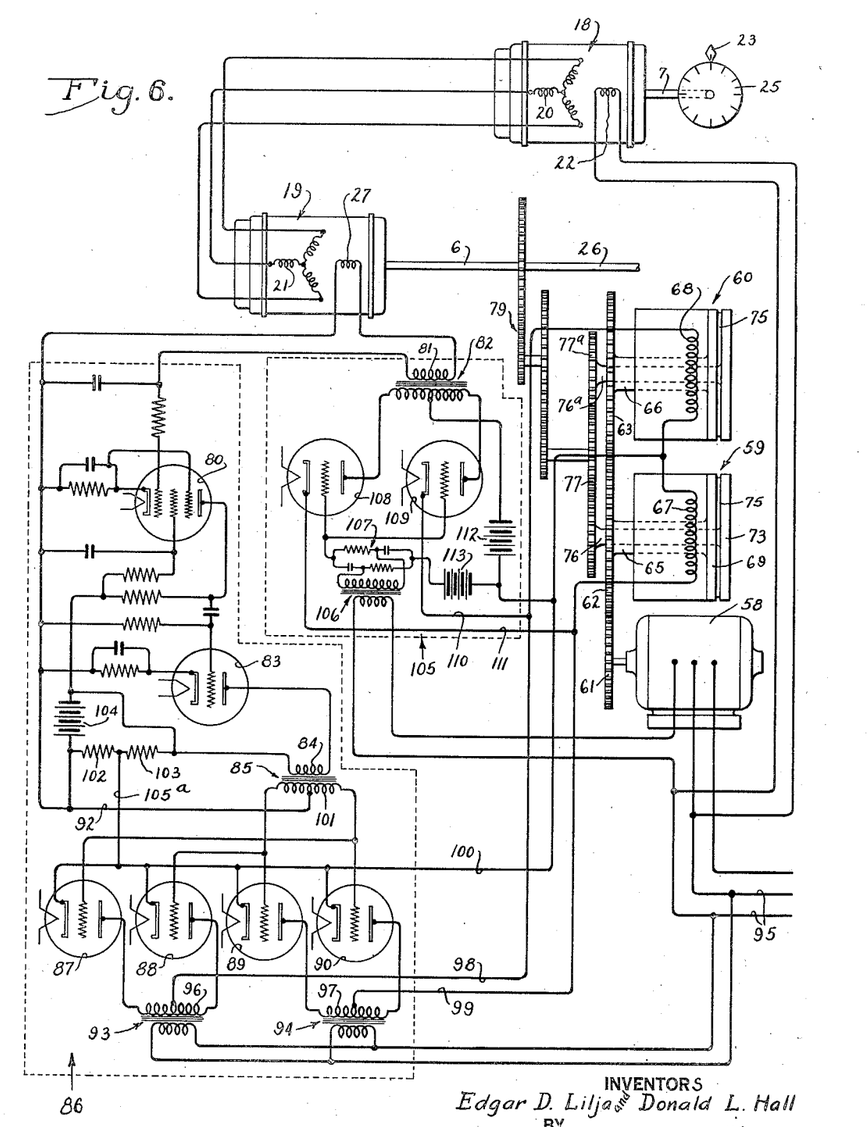
Fig. 6 is a schematic view and wiring diagram of a modification.

When the winding 67 is energized, the disk 75 will be gripped between the rotating plates 69 and 73 and power will be transmitted from the motor 58 to the shaft 6 and the load in one direction and at a speed determined by the degree of winding energization. Slippage of the clutch permits of such variable power transmission from the continuously operating motor. A variable transmission of power to the load but in the opposite direction will take place when the winding 68 of the clutch 60 is energized.

To adapt the present invention to such a clutch type servo actuator, the potential induced in the winding 27 of the synchro 19 together with a secondary potential for stabilizing purposes is applied to the input circuit of the first tube 80 of a multi-stage amplifier and electronic control network 86. The output of this network is utilized in effecting selective energization of the clutches 59 and 60. In the input circuit of the pentode tube is the synchro winding 27 and the secondary winding 81 of a coupling transformer 82, the potential applied from the latter being supplied for stabilizing purposes as later described. The output circuit of the tube is amplified as before by means including a tube 83 whose output circuit including the primary winding 84 of a coupling transformer 85. The final or output stage of the network 86 comprises two triode tubes 87 and 88 arranged to control the clutch 60, while two tubes 89, 90 control the clutch 59. The grids of the tubes 88 and 89 are connected to one end terminal of the secondary winding 101 of the transformer 85 while the grids of tubes 87 and 90 are connected to the other end terminal of this winding, its center terminal being connected to the common line 92.

On the output sides, plate voltage is supplied from two power transformers 93 and 94 having primary windings excited from alternating current supply lines 95. The secondary windings 96 and 97 having center taps connected respectively through conductors 98 and 99 to the clutch exciting windings 68 and 67 which have a return line 100 common to the cathodes of the tubes 87 to 90. The end terminals of the secondary winding 96 are connected to the respective anodes of tubes 86 and 87, while the end terminals of the other secondary winding 97 are connected to the anodes of the tubes 89 and 90.

Of the four tubes 87 to 90, only one is conductive at any one time. At any instant, this is the one whose grid is connected to the positive side of the coupling transformer secondary winding 101 and whose plate is at that same instant energized positively from the corresponding one of the power transformers 93, 94. By way of illustration, it may be assumed that at a given instant, the righthand terminals of each of the three transformer secondaries 96, 97 and 101 are positive and the lefthand terminals negative. In such case only the tube 90 has the necessary combination of positive plate potential and relatively positive grid potential to render the tube conductive, wherefore current flows through its plate circuit energizing the winding 67 of the clutch 59. On the next half cycle, all of the polarities will be reversed and the companion tube 89 will conduct, again energizing that same clutch winding 67. If, however, the phase of the voltage across the coupling transformer secondary winding 101 is reversed, as is the case when there is a discrepancy in angular position between the shafts 6 and 7 in a sense opposite to that prevailing for the conditions assumed above, the other two tubes 87 and 88 will conduct during alternate half cycles, thereby energizing the winding 68 of the clutch 60. It is to be observed that the grids of the tubes 87 to 90 are not permitted to become positive with respect to their corresponding cathodes by virtue of the negative biasing applied to such grids with respect to their cathodes. The negative bias is obtained by means of a voltage divider comprising resistors 102, 103 connected across the network battery 104 and having a mid tap connected by a conductor 105ª to the common line 100 of the cathodes.

The action of the synchros 18 and 19, the network 86, and the magnetic friction clutches 59 and 60 in controlling the transmission of power from the motor 58 to the load shaft 6 is essentially the same as previously described in connection with Fig. 1. In this case, however, the variable speed of the driven shaft 6 is due to frictional slippage occurring between the gripping faces of the active clutch and the torque is proportional to the degree of energization of the clutch.

The load reaction voltage which, as before, is fed back into the amplifier to stabilize the servo action is derived from the main windings of the motor 58 through a transformer 106 whose primary is interposed in one power lead to the motor and is thus responsive to the input current of the motor. Since this motor always runs in one direction, an electronic relay indicated at 105 is provided to differentiate between acceleration and deceleration of the servo and thereby impart the proper phase to the stabilizing voltage fed back into the amplifier. Herein, this relay, which responds to the voltage drop across a phase shifter 107, is connected across the secondary of the transformer 106. This voltage is applied to the grids of two vacuum tubes 108 and 109 which are normally biased beyond the point of cut-off. The cathodes of the tubes are connected by conductors 110 and 111 to the conductors 98 and 99 leading to the clutch windings 68 and 67. A battery 112 supplies the plate voltage for the tubes and a battery 113 is interposed between the phase shifter 107 and the common clutch lead 100. Thus, when one clutch, for example 59 is energized, the voltage applied to the grid of the tube 108 is equal to the battery voltage less the clutch voltage thereby enabling the tube to conduct. At the same time the grid of the tube 109 remains negative and this tube is inactive.

With this arrangement, when the discrepancy in angular position between the shafts 6 and 7 is in a direction such that the amplifier 86 causes energization of the clutch 60, the voltage drop in the clutch winding changes the bias of the tube 109 which amplifies the voltage supplied by the transformer 106 and through the transformer 82 feeds this amplified voltage back into the amplifier 86 thus adding it to the discrepancy voltage. If the discrepancy is of such direction that the clutch 59 is energized, the tube 108 will act as the amplifier for the voltage from the transformer 106 thereby feeding this voltage back into the main amplifier in a reverse phase direction. In this way, the electronic relay responds to a voltage whose magnitude is a function of the servo motor input current and converts this into a voltage which is of corresponding magnitude and of a phase which is a function of the direction of the acceleration. The resultant feed back voltage is of the same character as the feed back voltage derived directly from the servo motor in the form shown in Fig. 1, and it functions in the manner previously described to stabilize the servo action and cause the driven shaft to follow the control element 7 accurately.

Figure 8:
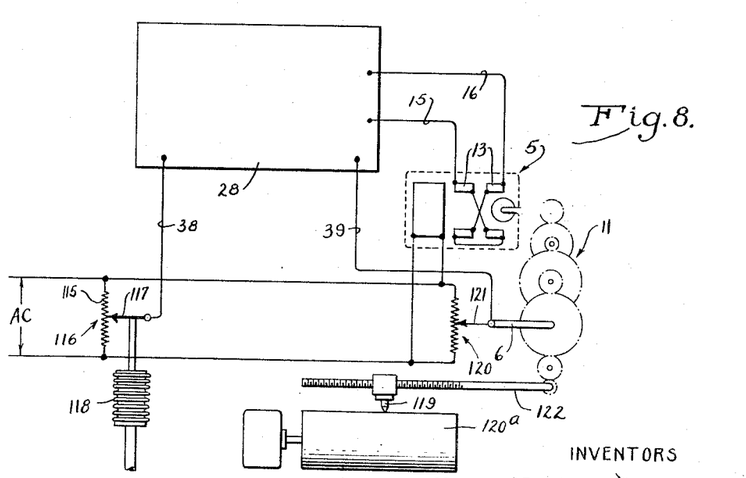

From the foregoing, it will be obvious that the servo actuator with a stabilizing control of the character described is of wide applicability particularly to effect remote positioning in apparatus where the tendency toward hunting is due largely to the inertia of the servo parts and the load as distinguished from lags inherent in the apparatus itself. For example, the driven shaft 6 may be arranged to operate a feed element in an automatic profiling machine tool. Or, it may actuate an element for indicating or recording the changing values of a condition. Also, the main control voltage may be derived in various ways other than by the relative movement between the shafts of two synchros as in the systems described above. Thus, as in Fig. 8, the voltage may be the potential drop across part of the resistor 115 of a potentiometer 116 having a slider 117 which is moved back and forth in response to changes in various conditions such as pressure, temperature, liquid level, etc. Thus, a bellows 118 responsive to pressure or temperature changes may be utilized to actuate the slider 117 in a recording system in which the driven shaft 6 drives a screw 122 for moving a recording pen 119 back and forth across a continuously moving chart 120ª. In such a system, a potentiometer 120 would be provided with its slider 121 actuated by the servo in unison with the motion of the pen so that, in response to a change in the position of the control slider 117 and the resulting operation of the servo, the balance of the control circuit for the amplifier will be restored. Accordingly, the servo will move the pen back and forth to follow the movements of the control slider 117 and the changing values of the controlling condition, the stabilizer voltage derived from the motor circuit acting in the manner previously described to prevent hunting.

Figure 7:
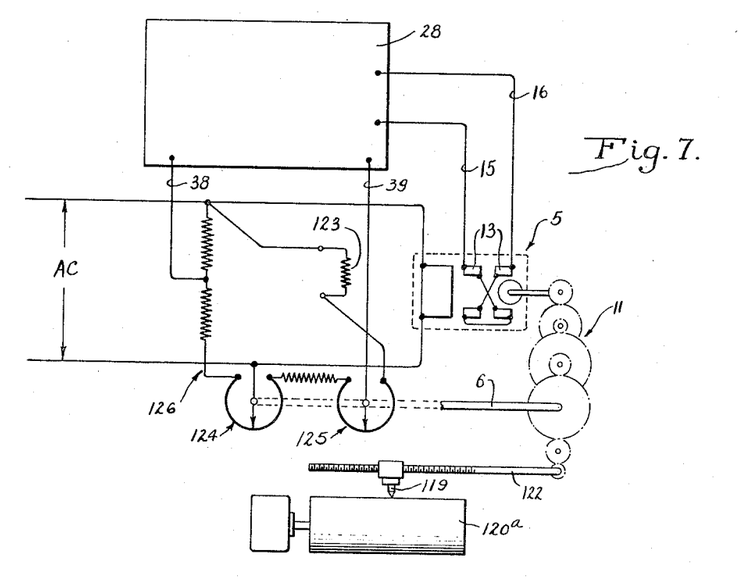
Figs. 7 and 8 are schematic views and wiring diagrams of other modifications and adaptations.

For other applications, the control voltage may be derived without the movement of any control element. For example, in a resistance thermometer as shown in Fig. 7, the main control voltage may be obtained by means of a resistor 123 whose resistance varies with changes in the temperature to which the resistor is exposed. This element may constitute one leg of a Wheatstone bridge circuit 126 having potentiometers 124 and 125 with their sliders actuated by the servo driven shaft and in unison with the movements of the pen 119 to rebalance the bridge following a temperature change.

The term "load current" drawn by the "driving means" shall be understood in the following claims as being that current which varies significantly as the motor load is varied. In the case of the embodiment of the invention disclosed in Fig. 1, the load current shall be taken as that which flows through the windings 13 while in the embodiment of Fig. 6 it is the current in the windings of the motor 58 as supplied through one of the three phase leads 95.

We claim as our invention:

1. The method of controlling the energization of control windings governing the transmission of power by an electric motor to maintain positional agreement between a movable control member and a member driven by said motor, said method comprising creating a control voltage variable in accordance with the positional disagreement between said members, amplifying said voltage, applying the amplified voltage to said control windings to cause power delivery by said motor in a direction to restore positional agreement between said members, and adding algebraically to said control voltage a voltage which is proportional to the input current of said motor and in such a sense as to oppose the movement of said driven member as the condition of positional agreement is approached.

2. The method of controlling the energization of control windings governing the transmission of power by an electric motor to maintain positional agreement between a movable control member and a member driven by said motor, said method comprising creating a control voltage variable according to the direction and amount of the positional disagreement between said members, amplifying said control voltage, applying said amplified control voltage to said control windings to cause power transmission by said motor in such sense as to restore positional agreement between the members, and applying in series with said control voltage a stabilizing voltage proportional to current flow in said motor, said stabilizing voltage applied in such a sense with respect to said control voltage as to tend to oppose motion of said driven member in the direction of said positional agreement.

3. The method of controlling the operation of a reversible electric motor having windings governing delivery of power according to the magnitude and phase of an exciting current applied thereto, said method comprising applying to said windings a control voltage variable in magnitude and phase according to the deviation of a member driven by said motor away from a desired position, deriving from the circuit of said windings a voltage component which is a substantially linear function of the current supplied to said motor windings, and continuously adding said voltage component algebraically to said control voltage.

4. The method of controlling the selective energization of two magnetically controlled clutches to determine the amount and direction of power transmission from an electric motor to a driven member, said method comprising applying a control voltage to energize one or the other of said clutches according to the magnitude and direction of deviation of said member from a desired position, deriving from the electric input of said motor a secondary voltage which is a function of the motor load, and continuously adding said secondary voltage algebraically to said control voltage.

5. The method of controlling the operation of a reversible driving means including an electric motor and control windings governing the transmission of power by the motor to a driven member, said method comprising applying to said windings a control voltage variable according to the deviation of said member from a desired position and operable to determine the direction and speed of power transmission to the member for moving the latter to said position, deriving from the input to said motor a secondary voltage which is substantially proportional to the input current of said motor, and continuously adding said secondary voltage algebraically to said control voltage to modify said control voltage and cause a reversal in the resultant voltage applied to said windings in advance of complete movement of said member to said desired position.

6. The method of controlling the energization of control windings governing the transmission of power from an electric motor to a member driven by said motor, said method comprising creating a control voltage varying in accordance with deviations in the position of said member away from a desired position defining a control point, applying said control voltage to said control windings to determine the power transmission by said motor to move said member toward said position at a rate determined by the amount of the deviation, deriving from the input circuit of said motor a secondary voltage which is a substantially linear function of the current flowing through the motor, and superimposing said secondary voltage onto said control voltage to shift said control point in a direction to increase the rate of reduction of the torque tending to drive the member toward said desired position as said member approaches said position.

7. The method of controlling the operation of a reversible driving means including an electric motor and control windings governing the transmission of power by the motor to a driven member, said method comprising, applying a control voltage to said windings to cause the movement of said member toward a desired position at a rate which varies with the deviation of the member from such position, deriving from the input of said motor a voltage component which is a linear function of the load current of said motor, and algebraically adding said voltage component to said control voltage in a direction to reduce the effect of said control voltage in moving said member toward said position.

8. The combination of, an electric motor having an input circuit, a driven member, clutches having control windings energizable selectively to vary the transmission of power from said motor to said member in opposite directions respectively, means operable to derive a control voltage variable in magnitude and direction, an amplifying means having an input circuit energized by said control voltage and output circuits respectively connected to said windings, said amplifying means operating to energize one or the other of said control windings according to the phase of said control voltage, means deriving a secondary voltage from said motor input circuit, two electronic amplifiers each having an input circuit energized by said secondary voltage and an output circuit delivering currents of opposite phase, means operable selectively to render one or the other of said amplifiers operative depending on which of said clutch windings is energized, and means interconnecting the input circuit of said amplifying means and the output circuits of said amplifiers whereby to superimpose on said control voltage a stabilizing voltage of variable magnitude and phase.

9. The combination of, an electric motor having an input circuit, a driven member, clutches engageable selectively to vary the transmission of power from said motor to said member in opposite directions respectively, means operable to derive a variable control voltage, an amplifier having an input circuit energized by said control voltage and operating to energize one or the other of said clutches according to the phase of said control voltage, a relay energized from said motor input circuit and operable selectively according to which of said clutches is active to derive a secondary voltage variable in phase with said control voltage and in magnitude with the load on said motor, and means for superimposing said secondary voltage on said control voltage in the input circuit of said amplifier.

10. The combination of, an electric motor having an input circuit, a driven member, friction clutches energizable selectively to vary the transmission of power from said motor to said member in opposite directions respectively, means operable to derive a control voltage variable in magnitude and direction, an amplifier energized by said control voltage and operable selectively to energize said clutches, said amplifier operating to energize one or the other of said clutches according to the phase of said control voltage, and means energized from input to said motor which means energize said amplifier input circuit to superimpose a secondary stabilizing voltage on said control voltage.

11. The combination of, an electric motor having an input circuit, a driven member, magnetic friction clutches having control windings energizable selectively to vary the transmission of power from said motor to said member in opposite directions respectively, means operable to derive a control voltage variable in magnitude and direction, an amplifier having an input circuit energized by said control voltage and output circuits respectively connected to said windings, said amplifier operating to energize one or the other of said control windings according to the phase of said control voltage, a transformer energized from said motor input circuit, an electronic relay energized from said transformer and operable to apply to said amplifier input circuit a secondary voltage of a phase determined by which of said clutch windings is energized.

12. The combination of, an electric motor having an input circuit, a driven member, clutches engageable selectively to vary the transmission of power from said motor to said member in opposite directions respectively, means operable to derive a variable control voltage and cause engagement of one or the other of said clutches depending on the sense of said voltage, means deriving a secondary voltage from said input circuit, and means for superimposing on said control voltage a stabilizing voltage proportional in magnitude to said secondary voltage and of a sense determined by which of said clutches is active.

13. The combination of, an electric motor having an input circuit, a driven member, clutches engageable selectively to vary the transmission of power from said motor to said member in opposite directions respectively, means operable to derive a variable control voltage and cause engagement of one or the other of said clutches depending on the sense of said voltage, means deriving a secondary voltage from said input circuit, and an electronic relay energized by said secondary voltage and operable to superimpose on said control voltage a stabilizing component of a sense depending on which of said clutches is engaged.

14. The combination of, a reversible driving means including an electric motor and control windings energizable to govern the direction and amount of power transmitted to a driven member from said motor, means for deriving a control voltage variable in magnitude and sense with the deviation of said member from a desired position, an amplifier having an input circuit energized by said control voltage and an output circuit energizing said control windings, means deriving from an input circuit of said motor a secondary voltage which is a substantially linear function of the current flowing through said motor, and means operable to add said secondary voltage to said control voltage in said input circuit to thereby modify the output of said amplifier and stabilize the operation of said driving means in positioning said member.

15. The combination of, a reversible driving means including an electric motor control winding energizable to govern the transmission of power to a driven member and maintain positional agreement between the latter and a variably movable control element, means operable to derive a control voltage variable in magnitude and sense according to the positional disagreement between said member and said element, an amplifier having an input circuit energized by said control voltage and an output circuit energizing said control winding to cause the motor to return said member toward positional agreement with said element, and transformer means variably energized by the current flowing through said motor winding and operable to apply to said amplifier input circuit in series relation with said control voltage a secondary voltage of a sense to reduce the tendency of said driving means and driven member to overrun the position of agreement with said element.

16. The combination of, a reversible driving means including electric motor control windings energizable to govern the transmission of power to a driven member and maintain positional agreement between the latter and a variably movable control element, means operable to apply to said control windings a control voltage variable in magnitude and sense with the positional disagreement between said member and said element whereby to cause movement of said member toward positional agreement with said element, and transformer means in series with said windings operable to derive from the input of said motor and to superimpose on said control voltage a secondary voltage operative in advance of full attainment of said positional agreement to reverse the resultant current flowing through said windings.

17. The combination of, a reversible electric motor having a control winding and operable to drive a loaded member in a direction and at a speed determined by the magnitude and phase of the voltage applied to said winding, means for deriving and applying to said winding a control voltage variable in magnitude and phase according to the deviation of said member from a desired position, current responsive means conducting the current in said control winding circuit to produce a secondary voltage which is a substantially linear function of the load on said member, and means operable to superimpose said secondary voltage on said control voltage to modify the latter as applied to said winding and stabilize the operation of said motor in positioning said member.

18. A servo mechanism having, in combination, a driven member, an electric motor, a selectively energizable clutch for transmitting power from said motor to said member at a rate proportional to the degree of clutch energization, and means for modifying the energization of said clutch in direct proportion to the current changes in the input circuit of said motor.

19. Apparatus for maintaining positional agreement between a driven member and a movable control element comprising, in combination, reversible electric driving means adapted to draw load current and including windings for governing the transmission of power from said driving means to said member, amplifier means responsive to the displacement of said element and operable to apply to said windings a voltage proportional in magnitude and corresponding in sense to the positional disagreement between said element and said member, means including a transformer having a primary winding arranged to conduct the load current drawn by said driving means, said transformer having a secondary winding in series with the input of said amplifier means, so that the current supplied to said driving means is effective to produce a secondary voltage having a stabilizing anti-hunt effect on said driving means.

20. The combination of a driven member, reversible electric driving means having windings governing the transmission of torque to said driven member, means for creating a main control voltage which varies in accordance with deviations in the position of said member away from a desired position defined as a control point, means including an amplifier excited by said control voltage for applying corresponding voltage to said control windings to cause movement of said driven member toward the control point at a rate which is a function of the amount of deviation therefrom, means including a transformer for producing a secondary voltage which is a substantially linear function of the magnitude of the load current drawn by said driving means, and means for applying said secondary voltage in series with said main control voltage to increase the rate of reduction of the torque tending to drive said member toward said control point as said member approaches said control point.

21. The combination of a reversible electric driving means including windings energizable to vary the power output to a driven member, means for deriving a main control voltage variable in magnitude and sense with deviations of said member from a stated position, means including an amplifier having an input circuit energized by said control voltage and an output circuit energizing said motor windings, and a transformer having a primary winding, means for supplying to said primary winding a current which is proportional to the load current supplied to said electric driving means, said transformer further having a secondary winding connected to said input circuit for applying auxiliary voltage thereto, the current supplied to said primary winding by said current supplying means being so phased that the induced voltage as said electric driving means approaches said stated position is in opposition to said main control voltage.

22. In an electric servo mechanism the combination comprising a driven member, reversible electric driving means adapted to draw load current and having windings governing the transmission of mechanical movement to said driven member, means for creating a main control voltage varying in accordance with deviations in the position of said driven member away from a desired position defined as a control point, means for applying said control voltage to said motor windings to cause said driving means to move said driven member toward said position at a rate which is a function of the amount of deviation, means including a transformer having a primary winding, means exciting said primary winding with a current which is substantially proportional to the load current drawn by said driving means, a secondary winding on said transformer, said secondary winding being arranged in series with said control voltage creating means, said transformer windings being so polarized that current drawn by said electric driving means produces a voltage in said secondary winding which tends to buck said main control voltage and thereby to prevent overtravel as said driving means reaches its control point.

EDGAR D. LILJA.
DONALD L. HALL.

REFERENCES CITED

The following references are of record in the file of this patent:

UNITED STATES PATENTS

| Number | Name | Date |
|---|---|---|
| 2,025,749 | Hubbard | Dec. 31, 1935 |
| 2,040,014 | Moseley | May 5, 1936 |
| 2,159,142 | Fischer | May 23, 1939 |
| 2,192,022 | Wills | Feb. 27, 1940 |
| 2,243,456 | Dutter | May 27, 1941 |
| 2,263,497 | Harrison | Nov. 18, 1941 |
| 2,286,778 | Winther | June 16, 1942 |
| 2,402,210 | Ryder et al. | June 18, 1946 |